(12) United States Patent
Kobayashi et al.

(10) Patent No.: US 12,246,335 B2
(45) Date of Patent: Mar. 11, 2025

(54) PAINT MIST COLLECTION DEVICE

(71) Applicant: TOYOTA JIDOSHA KABUSHIKI KAISHA, Toyota (JP)

(72) Inventors: Motoya Kobayashi, Toyota (JP); Kei Ito, Nagakute (JP); Daiyu Kato, Nagoya (JP); Suzuka Onoda, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 376 days.

(21) Appl. No.: 17/811,399

(22) Filed: Jul. 8, 2022

(65) Prior Publication Data

US 2023/0038492 A1  Feb. 9, 2023

(30) Foreign Application Priority Data

Aug. 6, 2021  (JP) .................. 2021-129988

(51) Int. Cl.
  *B05B 14/43*  (2018.01)
  *B01D 46/00*  (2022.01)
  *B05B 16/60*  (2018.01)
(52) U.S. Cl.
  CPC .......... *B05B 14/43* (2018.02); *B01D 46/0005* (2013.01); *B05B 16/60* (2018.02)

(58) Field of Classification Search
  USPC ...................................... 55/DIG. 46
  See application file for complete search history.

(56) References Cited

U.S. PATENT DOCUMENTS

| 11,235,346 B1 | 2/2022 | Ishida et al. |
| 2018/0345194 A1 | 12/2018 | Gregerson et al. |
| 2020/0398300 A1 | 12/2020 | Saito et al. |
| 2021/0260614 A1 | 8/2021 | Saito et al. |

FOREIGN PATENT DOCUMENTS

| DE | 10 2013 020 311 A1 | 8/2015 | |
| DE | 10 2015 202 257 A1 | 8/2018 | |
| JP | 2009-125647 A | 6/2009 | |
| JP | 2021-580 A | 1/2021 | |
| WO | WO 2004024341 A1 * | 3/2004 | ............. B05B 14/43 |

* cited by examiner

*Primary Examiner* — Jason M Greene
(74) *Attorney, Agent, or Firm* — Oblon, McClelland, Maier & Neustadt, L.L.P.

(57) ABSTRACT

A paint mist collection device includes: a housing configured such that an air flow containing paint mist discharged form a painting chamber flows into the housing; a collection filter disposed in the housing to collect the paint mist and configured to be taken out of the housing to be replaced; and a spacer member. The spacer member is held in a clearance between an in-flow opening portion of the collection filter and the inner surface of the housing.

18 Claims, 11 Drawing Sheets

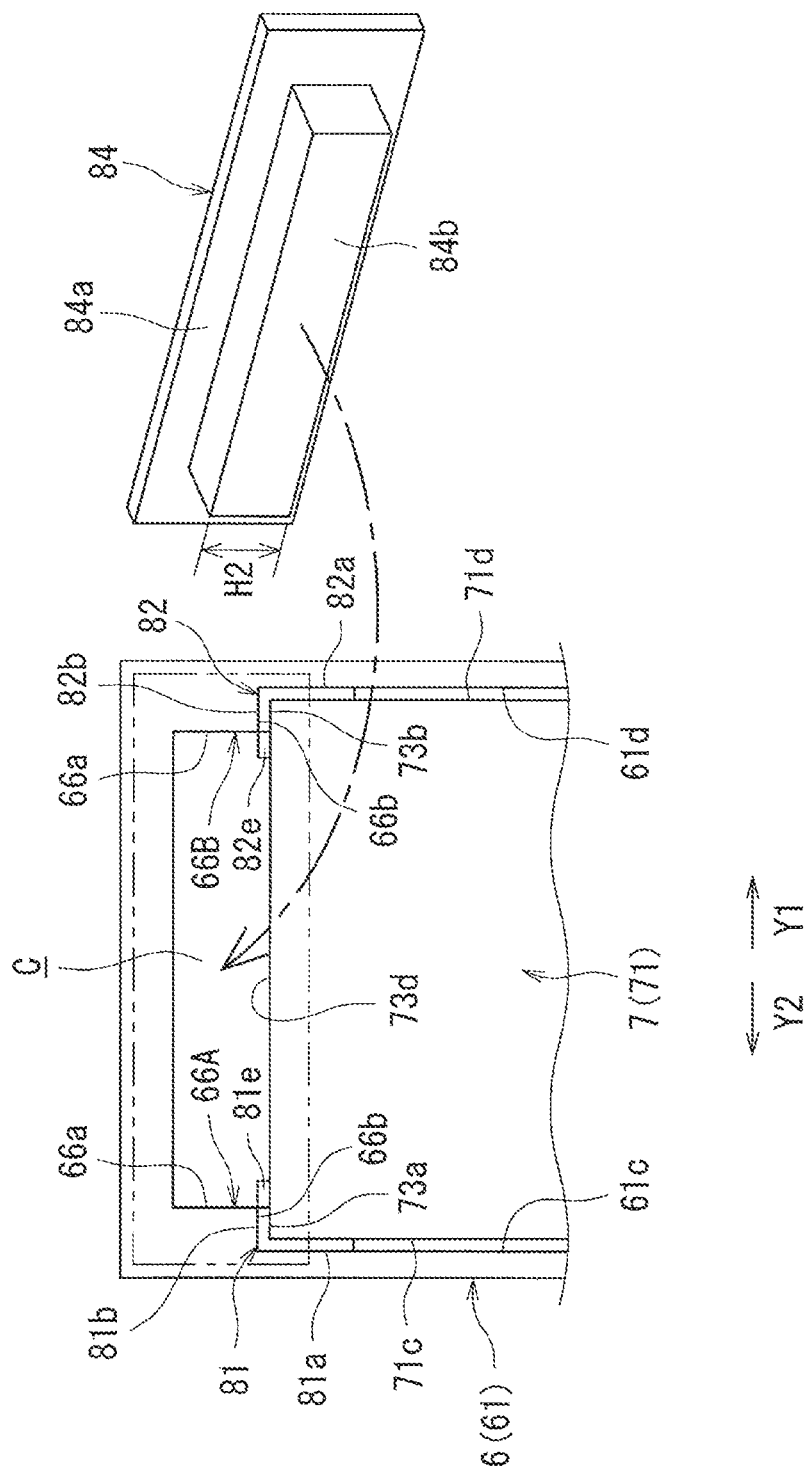

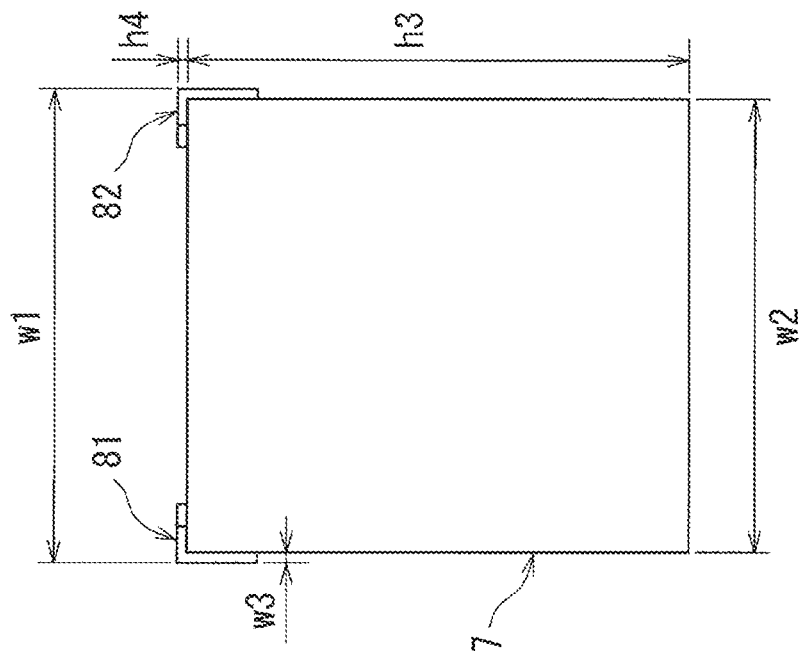
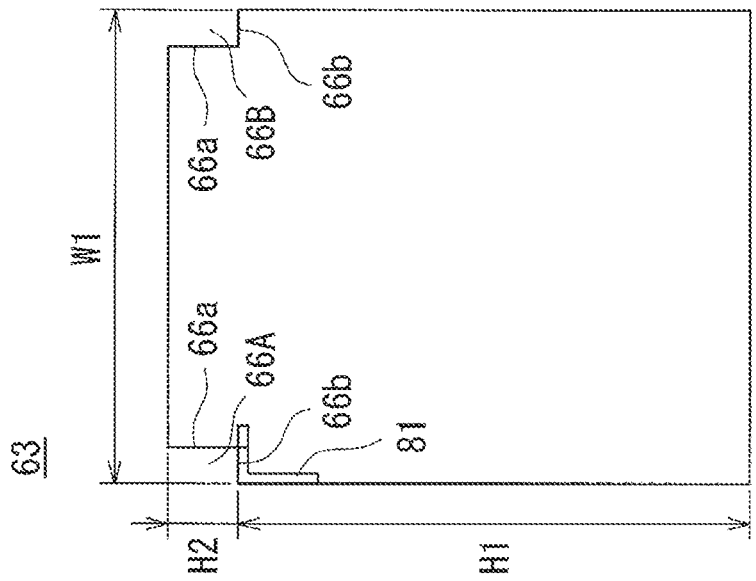
FIG. 6A
FIG. 6B

PAINT MIST COLLECTION DEVICE

CROSS-REFERENCE TO RELATED APPLICATION

This application claims priority to Japanese Patent Application No. 2021-129988 filed on Aug. 6, 2021, incorporated herein by reference in its entirety.

BACKGROUND

1. Technical Field

The present disclosure relates to a paint mist collection device provided in a painting facility.

2. Description of Related Art

Paint mist collection devices that collect extra paint mist (over spray mist that was not applied to an object to be painted) discharged from a painting chamber of a painting facility to suppress the release of the paint mist to the outside of the painting facility have been spread in recent years. Paint mist collection devices of a dry type (dry system) that collect paint mist using a collection filter are known as such paint mist collection devices. The paint mist collection devices of the dry type do not require a water circulation facility or an effluent treatment facility, which is required for paint mist collection devices of a wet type that collect paint mist by causing the paint mist to contact a liquid such as water, and therefore contribute to simplifying the painting facility.

Japanese Unexamined Patent Application Publication No. 2009-125647 (JP 2009-125647 A) discloses a painting facility provided with a paint mist collection device of a dry type. As disclosed in JP 2009-125647 A, the paint mist collection device of the dry type is generally disposed adjacent to (e.g. adjacently on the lower side of) a painting chamber. The paint mist collection device of the dry type is configured such that a collection filter is housed inside a housing. An air flow discharged from the painting chamber flows into the housing, and paint mist contained in the air flow is collected by the collection filter. The air from which the paint mist has been removed in this manner (air that have been purified) is discharged from the housing.

When there is a gap between the inner surface of the housing and the collection filter in the paint mist collection device of this type, paint mist that has passed through the gap may be released to the outside of the paint mist collection device. Thus, in order to suppress the release of the paint mist, the collection filter is housed inside the housing with the inner surface of the housing and the collection filter in contact with each other.

SUMMARY

In the paint mist collection device of the dry type, the collection performance tends to be lowered as the amount of the paint mist collected by the collection filter becomes larger. It is necessary to regularly replace the collection filter in order to maintain a good performance of the paint mist collection device to collect the paint mist. The collection filter is replaced by taking out (extracting) the collection filter from the housing and thereafter inserting a new collection filter into the housing.

As discussed above, the inner surface of the housing and the collection filter are in contact with each other. Therefore, paint mist that has flowed into the housing in collecting the paint mist is occasionally deposited continuously across both the inner surface of the housing and the collection filter (in particular, an in-flow opening portion of the collection filter for in an air flow). The housing and the collection filter may stick to each other because of the paint when a large amount of the paint mist is deposited. In this case, it is difficult to take the collection filter out of the housing, which may complicate the work of replacing the collection filter or make it impossible to replace the collection filter.

The present disclosure provides a paint mist collection device that allows a collection filter to be taken out of a housing easily.

The present disclosure provides a paint mist collection device including: a housing configured such that an air flow containing paint mist discharged from a painting chamber flows into the housing; a collection filter disposed in the housing to collect the paint mist and configured to be taken out of the housing to be replaced; and a spacer member. The spacer member is held in a clearance between an in-flow opening portion of the collection filter configured such that the air flow flows into the in-flow opening portion and an inner surface of the housing. The in-flow opening portion of the collection filter is a portion of the collection filter that constitutes the periphery of a space that serves as an in-flow opening, for example.

The air flow discharged from the painting chamber flows into the housing. A part of the paint mist contained in the air flow that has flowed into the housing is occasionally deposited on the inner surface of the housing and the spacer member. The spacer member is held in the clearance between the in-flow opening portion of the collection filter and the inner surface of the housing. Therefore, deposition of the paint mist across both the inner surface of the housing and the in-flow opening portion of the collection filter is suppressed. Consequently, sticking of the housing and the collection filter due to the paint is suppressed. As a result, the collection filter can be easily taken out of the housing to be replaced, and therefore the collection filter can be replaced easily.

For example, the spacer member is taken out of the housing before the collection filter is taken out of the housing. In this case, the collection filter can be taken out of the housing with a clearance formed at a portion at which the spacer member has been held between the housing and the collection filter. Therefore, the collection filter can be taken out of the housing more easily, and the collection filter can be replaced easily.

In the paint mist collection device according to the present disclosure, a plurality of spacer members may be disposed along opening edges of the in-flow opening portion of the collection filter.

With this configuration, the work of disposing the spacer members and the work of taking out the spacer members can be performed easily compared to the case where a single spacer member of an integral shape formed along all of the opening edges of the in-flow opening portion of the collection filter is disposed, for example.

In the paint mist collection device according to the present disclosure, one or more opening edges that are included in the plurality of opening edges of the in-flow opening portion of the collection filter may extend along a take-out direction in which the collection filter is taken out of the housing, and one or more spacer members that are included in the plurality of spacer members may be disposed along the one or more opening edges that extend along the take-out direction.

With this configuration, the spacer members disposed along the opening edges that extend along the take-out direction can be extracted from the inside of the housing along the take-out direction. That is, the work of taking the spacer members out of the housing before the collection filter is taken out of the housing is facilitated. Therefore, the collection filter can be taken out more easily by easily forming a sufficient clearance between the housing and the collection filter.

In the paint mist collection device according to the present disclosure, the in-flow opening portion of the collection filter may open upward; and the spacer member may be a member with an L-shaped cross section that includes a vertical portion that abuts against an outer surface of an opening edge of the in-flow opening portion of the collection filter and a horizontal portion that abuts against a distal end of the opening edge.

The outer surface of the opening edge of the in-flow opening portion of the collection filter is covered by the vertical portion of the spacer member. The distal end of the opening edge of the in-flow opening portion of the collection filter is covered by the horizontal portion of the spacer member. Consequently, the inner surface of the housing and the opening edge of the in-flow opening portion of the collection filter are brought into no contact with each other. Therefore, sticking of the housing and the collection filter due to the paint can be suppressed as discussed earlier, and the collection filter can be taken out of the housing easily.

In the paint mist collection device according to the present disclosure, the housing may include an air flow introduction duct configured to introduce the air flow toward the in-flow opening portion of the collection filter; the in-flow opening portion of the collection filter may be smaller than an introduction opening of the air flow introduction duct; the air flow introduction duct may include a guiding member; the guiding member may include an inclined panel inclined toward an opening edge of the in-flow opening portion of the collection filter; and the spacer member may be held in a clearance between the in-flow opening portion of the collection filter and the guiding member.

The air flow that flows into the housing through the air flow introduction duct is guided toward the in-flow opening portion of the collection filter by the inclined panel of the guiding member. Consequently, the paint mist can be guided into the collection filter well. The spacer member is held in the clearance between the in-flow opening portion of the collection filter and the guiding member, and therefore direct hitting of the air flow that flows along the inclined panel against the spacer member can be avoided. Consequently, movement of the spacer member due to the wind pressure of the air flow can be suppressed, and therefore the state in which the spacer member is held can be maintained stably. As a result, deposition of the paint mist across both the inner surface of the housing and the in-flow opening portion of the collection filter can be suppressed reliably.

In the paint mist collection device according to the present disclosure, the spacer member may be disposed in a state of being elastically deformed by being held in the clearance between the in-flow opening portion of the collection filter and the guiding member.

With the spacer member elastically deformed in this manner, the outer surface of the spacer member is pressed against each of the in-flow opening portion of the collection filter and the guiding member. Consequently, the sealing property between each of the in-flow opening portion of the collection filter and the guiding member and the spacer member is secured well. Therefore, it is possible to avoid a situation in which a gap is formed between each of the in-flow opening portion of the collection filter and the guiding member and the spacer member and the paint mist is released to the outside of the paint mist collection device through the gap.

In the paint mist collection device according to the present disclosure, the housing may have a filter insertion opening and an opening; the filter insertion opening may be configured such that the collection filter is taken out of and inserted into the housing via the filter insertion opening during replacement of the collection filter; the opening is disposed between an upper edge portion of the filter insertion opening and an upper edge portion of the in-flow opening portion of the collection filter with the collection filter inserted into the housing through the filter insertion opening, the upper edge portion of the in-flow opening portion being positioned below the upper edge portion of the filter insertion opening, and the opening having a predetermined height; the spacer member may include a fitted portion that has a height that matches the height of the opening; and the fitted portion may be fitted into the opening.

The spacer member is held in the clearance between the inner surface of the housing and the in-flow opening portion of the collection filter after the collection filter is inserted into the housing. That is, the fitted portion of the spacer member is fitted into the opening disposed between the upper edge portion of the filter insertion opening and the upper edge portion of the in-flow opening portion of the collection filter. Consequently, the inner surface of the housing and the opening edge of the in-flow opening portion of the collection filter can be brought into no contact with each other. Therefore, sticking of the housing and the collection filter due to the paint can be suppressed, and the collection filter can be taken out of the housing easily.

In the paint mist collection device according to the present disclosure, the spacer member may be constituted by stacking peelable sheets.

By peeling a peelable sheet on which paint has been deposited, the paint can be removed from the spacer member together with the peelable sheet. Consequently, the spacer member can be reused with no paint deposited thereon.

With the paint mist collection device according to the present disclosure, the collection filter can be taken out of the housing easily.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 illustrates a state in which the collection filter is inserted into the housing and the work of mounting a fourth spacer member;

FIG. 6A illustrates the dimensions of each portion of a filter insertion opening of the housing;

FIG. 6B illustrates the dimensions of each portion of the collection filter, a first spacer member, and a second spacer member;

DETAILED DESCRIPTION OF EMBODIMENTS

An embodiment of the present disclosure will be described below with reference to the drawings. In the present embodiment, a paint mist collection device is installed in a recovery chamber disposed under a painting chamber in a painting facility.

Figure 1:
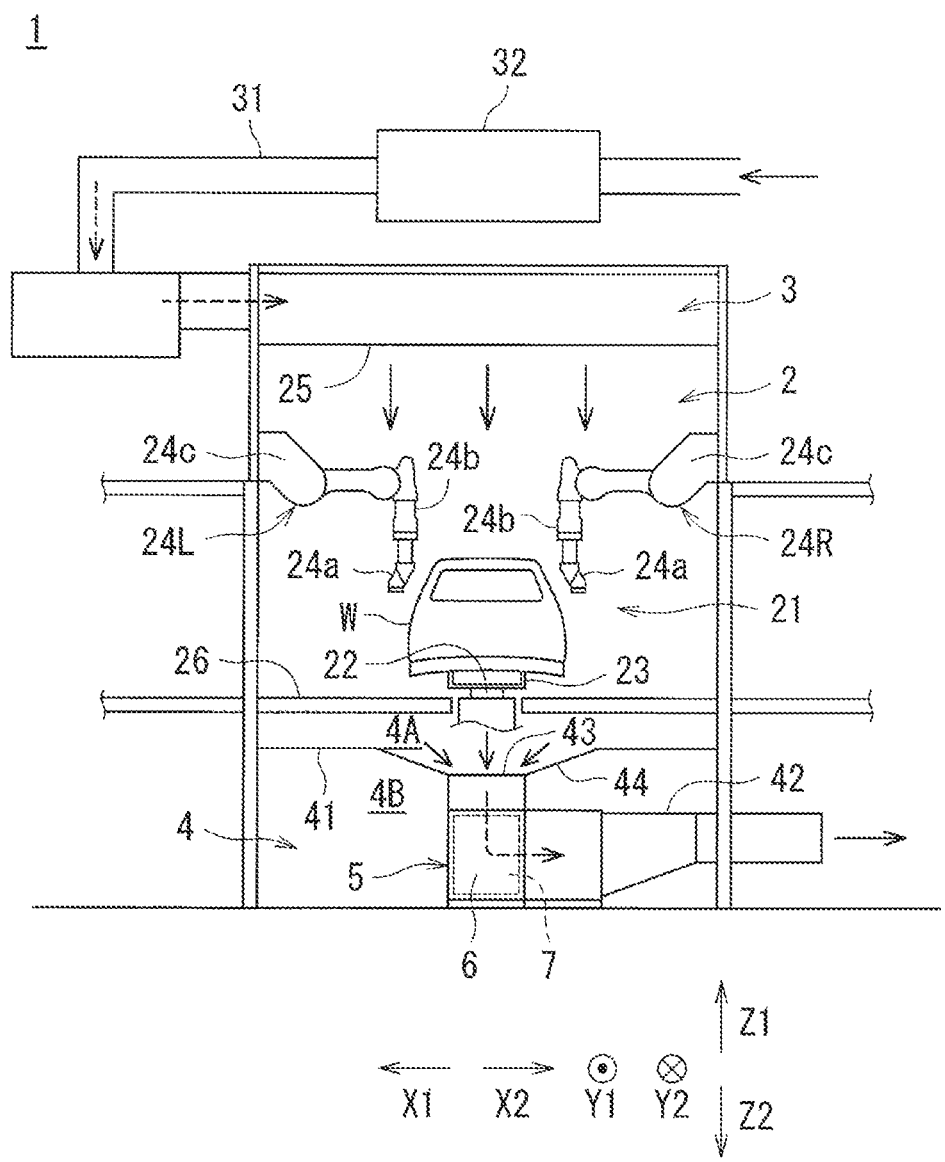
FIG. 1 illustrates a schematic configuration of a painting facility according to an embodiment.

FIG. 1 illustrates a schematic configuration of a painting facility (painting booth) 1 according to the present embodiment. As illustrated in FIG. 1, the painting facility 1 according to the present embodiment includes a painting chamber 2, an air feed chamber 3 disposed above the painting chamber 2, and a recovery chamber 4 disposed below the painting chamber 2.

In the following, the width direction of the painting facility 1 (the right-left direction in FIG. 1) is defined as an X direction. In the X direction, the left side of FIG. 1 is referred to as an X1 direction, and the right side of FIG. 1 is referred to as an X2 direction. The transfer direction of an object W to be painted (the direction that is orthogonal to the sheet surface of FIG. 1) is defined as a Y direction. In the Y direction, the front side of the sheet surface of FIG. 1 (the downstream side in the transfer direction of the object W to be painted) is referred to as a Y1 direction, and the back side of the sheet surface of FIG. 1 (the upstream side in the transfer direction of the object W to be painted) is referred to as a Y2 direction. The height direction of the painting facility 1 (the up-down direction in FIG. 1) is defined as a Z direction. In the Z direction, the upper side of FIG. 1 is referred to as a Z1 direction, and the lower side of FIG. 1 is referred to as a Z2 direction.

The painting chamber 2 includes a painting line 21 that extends in the Y direction in FIG. 1. The painting line 21 paints vehicle bodies of automobiles, for example, as the object (workpiece) W to be painted. The painting line 21 includes a transfer rail 22, a transfer carriage 23 that is movable on the transfer rail 22, and painting robots 24R, 24L disposed on both sides of the transfer rail 22 in the X direction.

As illustrated in FIG. 1, the transfer carriage 23 is moved on the transfer rail 22 with the object W to be painted placed on the transfer carriage 23. Consequently, the painting line 21 can move the object W to be painted along the Y direction (in the Y1 direction).

The painting robots 24R, 24L are each an articulated robot configured to atomize paint into particles and apply the particles to the object W to be painted. The painting robot 24L is installed on the side in the X1 direction with respect to the painting robot 24R. The painting robot 24L paints the left side surface and a region of the upper surface on the left side in FIG. 1, among the outer surfaces of the object W to be painted. On the other hand, the painting robot 24R paints the right side surface and a region of the upper surface on the right side in FIG. 1, among the outer surfaces of the object W to be painted.

The painting robots 24R, 24L each include a spray gun 24a that atomizes paint into particles, a robot arm 24b that moves the spray gun 24a, and a base 24c that supports the robot arm 24b. The painting robots 24R, 24L operate in accordance with a control signal from a robot controller (not illustrated). The robot controller is caused to store operation information in advance through off-line teaching. Consequently, the painting robots 24R, 24L paint the outer surfaces of the object W to be painted by spraying paint mist from the spray gun 24a toward the outer surfaces. The spray gun 24a is constituted as one with a rotary atomization head for a rotary atomization method. The painting method is not limited to the rotary atomization method, and may be an air atomization method, a liquid pressure atomization method, etc.

In the painting facility 1 according to the present embodiment, the painting robots 24R, 24L are disposed on the vertical walls of the painting chamber 2. However, the painting robots 24R, 24L may be disposed on the floor surface of the painting chamber 2. Not only one but also a plurality of painting robots 24R may be disposed on the side in the X2 direction, and not only one but also a plurality of painting robots 24L may be disposed on the side in the X1 direction.

A dry area (not illustrated) for drying the object W to be painted is installed on both sides of the painting chamber 2 in the Y direction (on both sides in the transfer direction of the object W to be painted). In the dry areas, the surfaces of the object W to be painted are dried by supplying heated air. That is, the object W to be painted that has been dried in the dry area on the upstream side in the transfer direction (on the side in the Y2 direction) is transferred to the painting chamber 2. In the painting chamber 2, the object W to be painted is painted by spraying paint mists from the spray guns 24a, 24a of the painting robots 24R, 24L to the object W to be painted. The object W to be painted that has been painted is transferred to the dry area on the downstream side in the transfer direction (on the side in the Y1 direction) to be dried.

An introduction port for introducing air from the air feed chamber 3 to be discussed later is formed in a ceiling portion 25 of the painting chamber 2. The introduction port has a mesh structure. A discharge port for discharging air toward the recovery chamber 4 to be discussed later is formed in a floor portion 26 of the painting chamber 2. The discharge port has a grating structure. Consequently, rectified air supplied from the air feed chamber 3 flows from the upper side toward the lower side in the painting chamber 2 to be discharged to the recovery chamber 4 (see the arrows in FIG. 1). Therefore, extra paint mist (over spray mist) that was not applied to the object W to be painted in the painting work in the painting chamber 2 flows along an air flow (downward flow) in the painting chamber 2 to be discharged from the painting chamber 2 to the recovery chamber 4.

The air feed chamber 3 is provided in order to supply air for ventilation to the painting chamber 2. An air conditioner 32 is connected to the air feed chamber 3 via an air feed duct 31. Purified air, the temperature and the humidity of which have been adjusted by the air conditioner 32, flows into the air feed chamber 3 via the air feed duct 31. The air feed chamber 3 has a function of rectifying air that has flowed in through the air feed duct 31 to adjust the amount of air to be introduced to the painting chamber 2.

As discussed earlier, an introduction port with a mesh structure is formed in the ceiling portion 25 of the painting chamber 2, and therefore an adjusted amount of rectified air is supplied from the air feed chamber 3 toward the painting chamber 2 as a downward flow.

The air feed chamber 3 is set to the same size as that of the painting chamber 2 as viewed in plan. That is, the width (length in the X direction) of the air feed chamber 3 is the same as the width of the painting chamber 2. The length (length in the Y direction) of the air feed chamber 3 is the same as the length of the painting chamber 2.

The recovery chamber 4 is provided in order to purify an air flow discharged from the painting chamber 2 and containing paint mist and discharge the purified air flow to the outside of the painting facility 1.

The recovery chamber 4 is configured to include an air flow guide 41, the paint mist collection device 5, and an exhaust duct 42.

The air flow guide 41 is formed from a metal plate disposed to extend in the horizontal direction in the recovery chamber 4. The outer peripheral edge of the air flow guide 41 is connected to the walls of the recovery chamber 4. The inside of the recovery chamber 4 is partitioned into an air flow guiding space 4A that is a space above the air flow guide 41 and a collection device installation space 4B that is a space below the air flow guide 41. An opening 43 that is rectangular as viewed in plan is formed at the center portion of the air flow guide 41. An inclined portion 44 inclined obliquely downward (inclined like a mortar) toward the center portion of the air flow guide 41 (toward the opening 43) is provided around the opening 43 of the air flow guide 41. An air flow discharged downward from the discharge port formed in the floor portion 26 of the painting chamber 2 and having flowed into the air flow guiding space 4A is guided along the inclined portion 44 to easily flow into the opening 43. The air flow guide 41 may be in a flat plate shape not provided with the inclined portion 44.

The paint mist collection device 5 is installed in the collection device installation space 4B. The paint mist collection device 5 purifies air by collecting paint mist contained in the air flow that has flowed in through the opening 43 of the air flow guide 41. The configuration of the paint mist collection device 5 will be discussed in detail later.

The exhaust duct 42 is connected to a discharge port of the paint mist collection device 5. The exhaust duct 42 discharges air discharged from the paint mist collection device 5 (air purified by collecting paint mist therefrom) to the outside of the painting facility 1. A blower (not illustrated) is disposed inside the exhaust duct 42. A negative pressure is generated inside the exhaust duct 42 as the blower operates. Consequently, an air flow that flows in the order of the opening 43 of the air flow guide 41, the internal space of the paint mist collection device 5, and the exhaust duct 42 is generated in the recovery chamber 4. The air to be discharged to the outside of the painting facility 1 is subjected to a volatile organic compound (VOC) gas removal process, for example, by a deodorization device (not illustrated).

Next, the paint mist collection device 5 installed in the recovery chamber 4 will be described.

Figure 2:
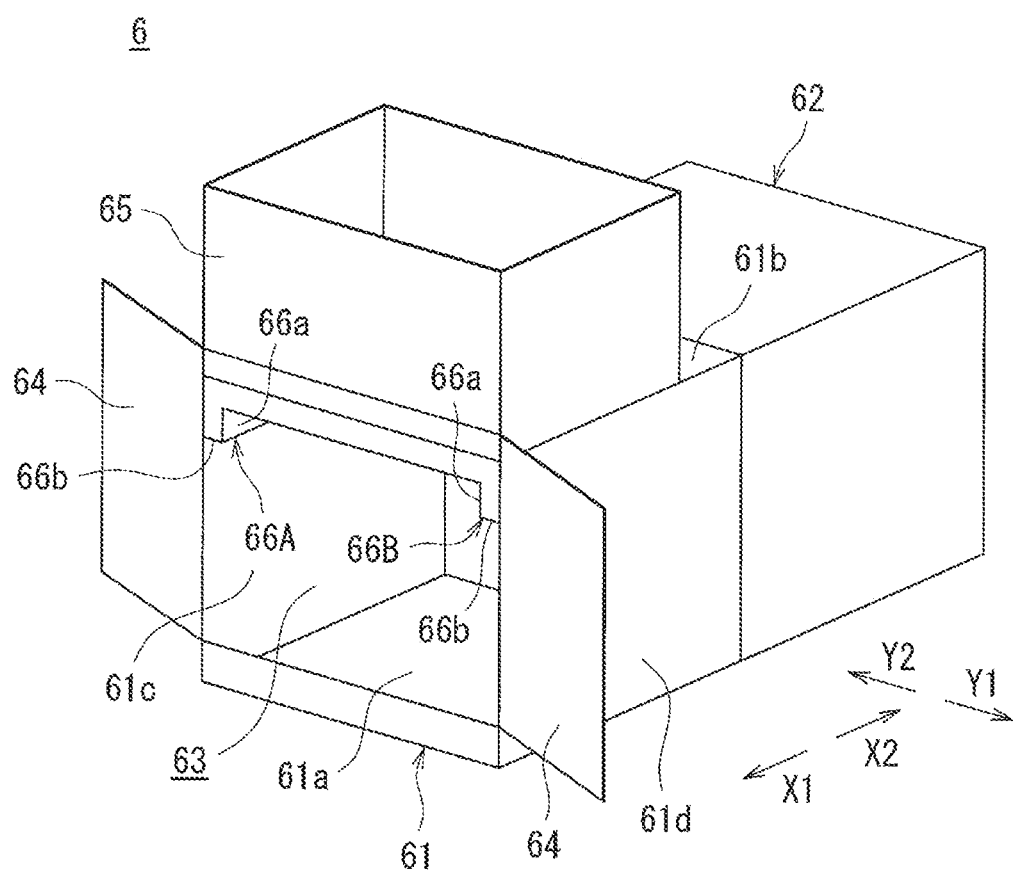
FIG. 2 is a perspective view illustrating a housing of a paint mist collection device.
Figure 3:
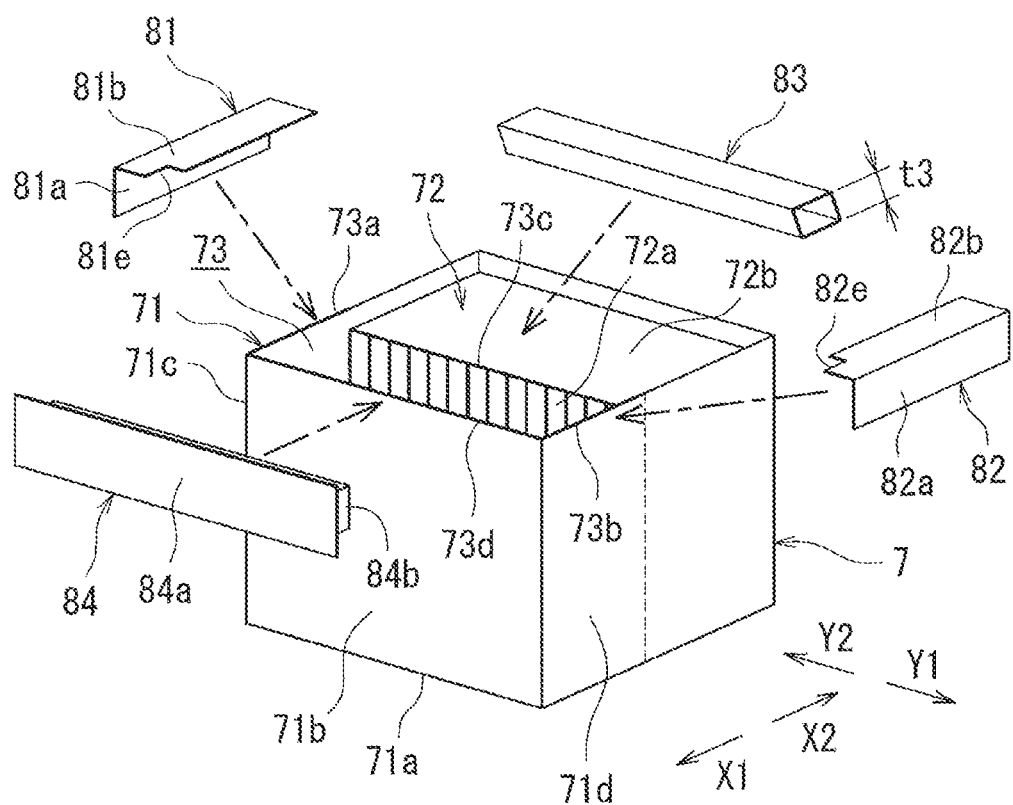
FIG. 3 is a perspective view illustrating a collection filter and spacer members of the paint mist collection device.
Figure 4:
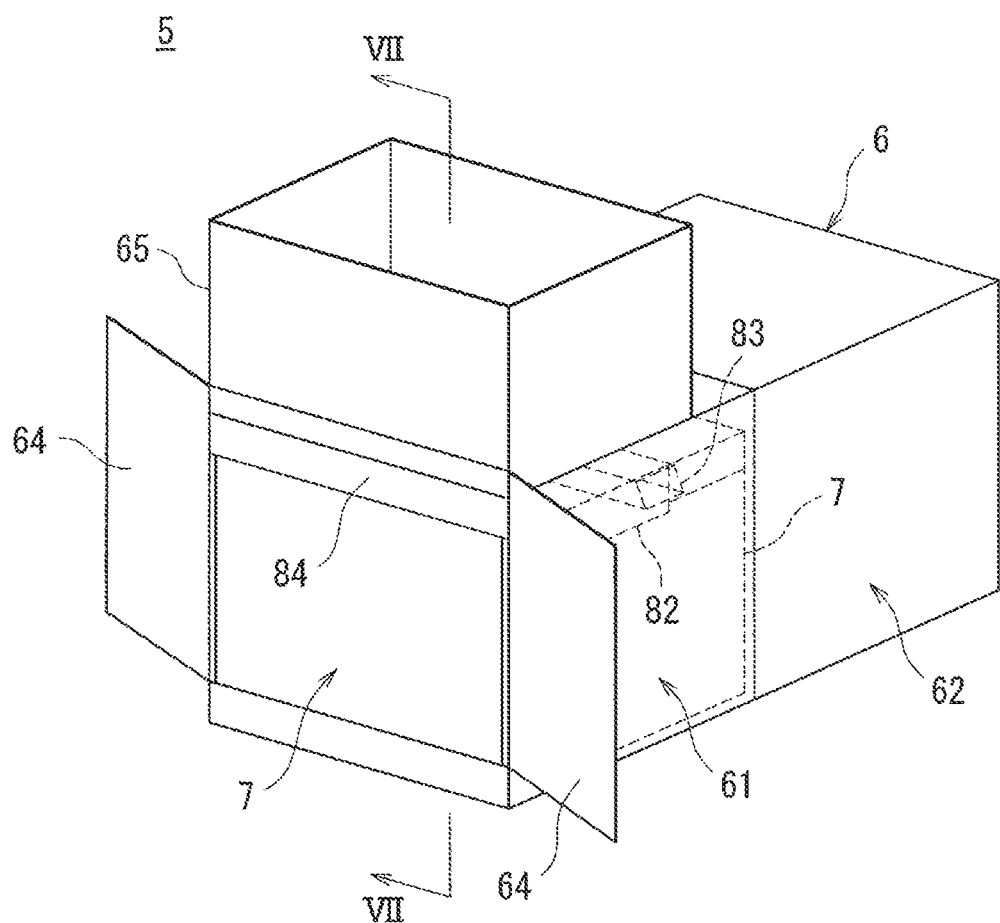
FIG. 4 is a perspective view illustrating a state in which the collection filter is inserted into the housing.

FIG. 2 is a perspective view illustrating the housing 6 of the paint mist collection device 5. FIG. 3 is a perspective view illustrating a collection filter 7, a first spacer member 81, a second spacer member 82, a third spacer member 83, and a fourth spacer member 84 of the paint mist collection device 5. Hereinafter, the first spacer member 81, the second spacer member 82, the third spacer member 83, and the fourth spacer member 84 will be collectively referred to as spacer members 81, 82, 83, 84. FIG. 4 is a perspective view illustrating a state in which the collection filter 7 is inserted into the housing 6.

As illustrated in the drawings, the paint mist collection device 5 is configured to include the housing 6, the collection filter 7, and the spacer members 81, 82, 83, 84. The collection filter 7 is disposed in (inserted into) the housing 6. The spacer members 81, 82, 83, 84 are held between the inner surfaces of the housing 6 and the collection filter 7. The members that constitute the paint mist collection device 5 will be described below.

The housing 6 is formed from sheet metal. As illustrated in FIG. 2, the housing 6 is constituted by integrally assembling a front housing 61 and a rear housing 62 to each other. The front housing 61 is disposed on side in the X1 direction with respect to the rear housing 62. The front housing 61 and the rear housing 62 are disposed so as to be continuous with each other. For the housing 6, the X direction is the direction in which an air flow that has flowed into the housing 6 from the upper side flows after changing its direction. The X1 direction corresponds to the upstream side in the air flow direction, and the X2 direction corresponds to the downstream side in the air flow direction.

The front housing 61 has a duct shape with a rectangular cross section with respective edge portions in the X1 direction and the X2 direction opened. That is, the front housing 61 is configured to include a bottom panel 61a, an upper surface panel 61b, and side surface panels 61c, 61d. The side surface panel 61c is disposed at an edge portion of the front housing 61 on the side in the Y2 direction. The side surface panel 61d is disposed at an edge portion of the front housing 61 on the side in the Y1 direction. A filter insertion opening 63 that opens in the X1 direction can be opened and closed by a pair of doors 64. In the present embodiment, one of the doors 64 is coupled to the outer edge portion of the filter insertion opening 63 on the side in the Y1 direction by a hinge (not illustrated). The other of the doors 64 is coupled to the outer edge portion of the filter insertion opening 63 on the side in the Y2 direction by a hinge (not illustrated). That is, the doors 64 are so-called double doors.

An air flow introduction duct 65 is provided on the upper surface panel 61b of the front housing 61. Specifically, a rectangular opening 65a (see FIG. 7) is formed in the upper surface panel 61b of the front housing 61 at a position on the side in the X1 direction with respect to the center portion of the upper surface panel 61b in the X direction. The air flow introduction duct 65 has vertical walls that extend upward from the respective edge portions of the opening 65a to a predetermined dimension. The opening shape (rectangular shape) at the upper end of the air flow introduction duct 65 matches the shape (rectangular shape) of the opening 43 of the air flow guide 41. The upper end edge of the air flow introduction duct 65 is joined to the edge portion of the opening 43. Consequently, the air flow guiding space 4A and the internal space of the housing 6 (more specifically, the internal space of the front housing 61) communicate with each other via the air flow introduction duct 65.

Corner beams 66A, 66B that extend along the X direction are disposed at portions of the front housing 61 at which the upper surface panel 61b and the side surface panels 61c, 61d are connected to each other. Each of the corner beams 66A, 66B includes a vertical wall portion 66a that extends downward from the upper surface panel 61b for a predetermined dimension and a horizontal portion 66b that extends from the side surface panel 61c, 61d toward the center in the Y direction for a predetermined dimension. Although not illustrated, an end edge of each of the corner beams 66A, 66B on the side in the X1 direction is positioned on the X2 side with respect to an end edge of the front housing 61 on the side in the X1 direction (the opening edge portion of the filter insertion opening 63). Consequently, a space that accommodates the fourth spacer member 84 to be discussed later is provided. The X-direction dimension of each of the corner beams 66A, 66B is set to be slightly longer than the X-direction dimension of an air flow introduction portion 71 of the collection filter 7 to be discussed later.

The rear housing 62 has a duct shape with a rectangular cross section with respective edge portions in the X1 direction and the X2 direction opened, as with the front housing 61. An end edge of the rear housing 62 on the side in the X1 direction and an end edge of the front housing 61 on the side in the X2 direction are joined to each other. Consequently, the internal space of the front housing 61 and the internal space of the rear housing 62 form a space that extends along the X direction (a space through which air flows). The exhaust duct 42 is connected to an end edge of the rear housing 62 on the side in the X2 direction (see FIG. 1). Air that has flowed through the internal space of the rear housing 62 is discharged to the outside of the painting facility 1 by way of the exhaust duct 42.

The collection filter 7 is disposed in the front housing 61 of the housing 6. The collection filter 7 collects paint mist in the air flow that has flowed into the collection filter 7. The collection filter 7 is configured to be taken out of the housing 6 to be replaced. Also for the collection filter 7, the X direction is the direction in which an air flow that has flowed in from the upper side flows after changing its direction. The X1 direction corresponds to the upstream side in the air flow direction, and the X2 direction corresponds to the downstream side in the air flow direction. The configuration of the collection filter 7 will be specifically described below.

As illustrated in FIG. 3, the collection filter 7 is made of paper (more specifically, made of corrugated cardboard), and is in a generally rectangular parallelepiped shape, for example. The collection filter 7 includes the air flow introduction portion 71 and a filter body portion 72.

The air flow introduction portion 71 is a portion of the collection filter 7 on the side in the X1 direction. The air flow introduction portion 71 includes a bottom panel 71a, a front surface panel 71b, and side surface panels 71c, 71d. The front surface panel 71b is disposed on the side in the X1 direction with respect to the air flow introduction portion 71. The side surface panel 71c is disposed on the side in the Y2 direction with respect to the air flow introduction portion 71. The side surface panel 71d is disposed on the side in the Y1 direction with respect to the air flow introduction portion 71. The upper part of the air flow introduction portion 71 is opened. An in-flow opening portion 73 is provided at the opened upper part of the air flow introduction portion 71. An air flow flows into the air flow introduction portion 71 through the in-flow opening portion 73. The in-flow opening portion 73 constitutes a rectangular opening. That is, the in-flow opening portion 73 is configured to include a first opening edge 73a, a second opening edge 73b, a third opening edge 73c, and a fourth opening edge 73d. The first opening edge 73a is positioned on the side in the Y2 direction with respect to the in-flow opening portion 73 to extend along the X direction. The second opening edge 73b is positioned on the side in the Y1 direction with respect to the in-flow opening portion 73 to extend along the X direction. The third opening edge 73c is positioned on the side in the X2 direction with respect to the in-flow opening portion 73 to extend along the Y direction. The third opening edge 73c corresponds to an edge portion of an upper surface 72b of the filter body portion 72, to be discussed later, on the side in the X1 direction. The fourth opening edge 73d is positioned on the side in the X1 direction with respect to the in-flow opening portion 73 to extend along the Y direction.

Figure 7:
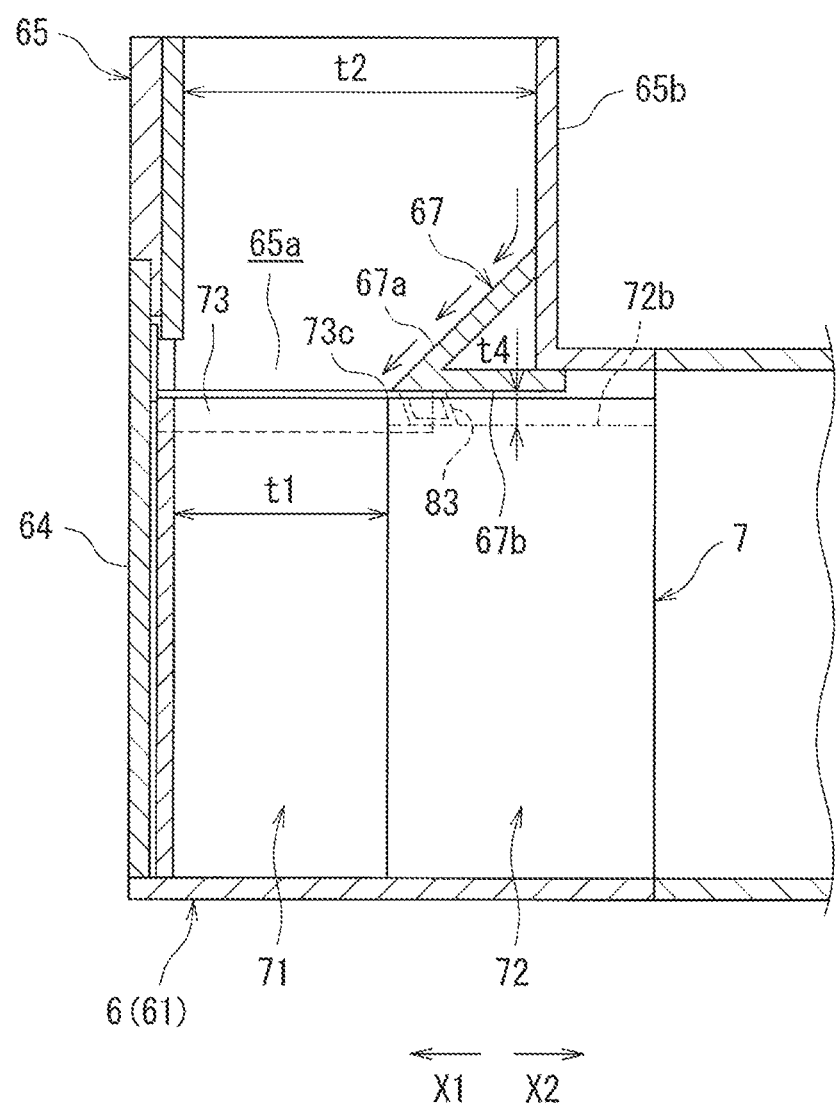
FIG. 7 is a sectional view taken along the line VII-VII in FIG. 4.

The filter body portion 72 is a portion of the collection filter 7 on the side in the X2 direction. The filter body portion 72 is constituted by stacking a plurality of filters 72a. The filters 72a may be made of paper, for example. The filter body portion 72 purifies air (removes paint mist therefrom) by collecting paint mist contained in the air flow that has flowed into the air flow introduction portion 71 by way of the in-flow opening portion 73. The height position of the upper surface 72b of the filter body portion 72 is slightly lower than the height position of the upper end of the air flow introduction portion 71. FIG. 7 is a sectional view taken along the line VII-VII in FIG. 4. As illustrated in FIG. 7, the dimension of the in-flow opening portion 73 in the X direction (dimension t1 in FIG. 7) is set to be smaller than the dimension of an opening at an upper end portion of the air flow introduction duct 65 in the X direction (dimension t2 in FIG. 7). A guiding member 67 that guides an air flow that has flowed in by way of the opening 43 of the air flow guide 41 to the in-flow opening portion 73 is provided inside the air flow introduction duct 65.

The guiding member 67 includes an inclined panel 67a and a horizontal panel 67b. The inclined panel 67a extends from an intermediate portion, in the up-down direction, of a vertical wall 65b of the air flow introduction duct 65 to the third opening edge 73c of the in-flow opening portion 73. The vertical wall 65b constitutes a portion of the air flow introduction duct 65 on the side in the X2 direction. The horizontal panel 67b extends in the horizontal direction at a position above the filter body portion 72. An end edge of the horizontal panel 67b on the side in the X1 direction is continuous with the lower end edge of the inclined panel 67a. Meanwhile, an end edge of the horizontal panel 67b on the side in the X2 direction is continuous with the lower end edge of the vertical wall 65b of the air flow introduction duct 65. Therefore, the air flow that has flowed into the air flow introduction duct 65 by way of the opening 43 of the air flow guide 41 is guided by the inclined panel 67a of the guiding member 67 to flow toward the in-flow opening portion 73 of the air flow introduction portion 71 as indicated by the arrows in FIG. 7.

The first spacer member 81 is made of paper (more specifically, made of corrugated cardboard), as with the collection filter 7. The first spacer member 81 is bent to have an L-shaped cross section. Specifically, as illustrated in FIG. 3, the first spacer member 81 is disposed at a position corresponding to the first opening edge 73a of the air flow introduction portion 71 of the collection filter 7. The first spacer member 81 includes a vertical portion 81a that extends in a direction (Z direction in FIG. 1) that is orthogonal to both the Y direction and the X direction, and a horizontal portion 81b that extends horizontally in the Y1 direction from the upper end edge of the vertical portion 81a. A notch 81e is provided at the corner portion of an end edge of the horizontal portion 81b on the side in the X1 direction. The dimension of the first spacer member 81 in the X direction is set to be slightly larger than the dimension of the first opening edge 73a of the air flow introduction portion 71 in the X direction. FIG. 5 illustrates a state in which the collection filter 7 is inserted into the housing 6. As illustrated in FIG. 5, the vertical portion 81a of the first spacer member 81 abuts against the outer surface of the side surface panel 71c of the air flow introduction portion 71 of the collection filter 7 on the side in the Y2 direction. The horizontal portion 81b of the first spacer member 81 abuts against the upper end of the first opening edge 73a of the air flow introduction portion 71 of the collection filter 7. That is, the entire first opening edge 73a of the air flow introduction portion 71 of the collection filter 7 is covered by the first spacer member 81.

The second spacer member 82 is configured to be symmetrical with respect to the first spacer member 81 discussed earlier. The second spacer member 82 is made of paper, as with the collection filter 7. The second spacer member 82 is bent to have an L-shaped cross section. Specifically, as illustrated in FIG. 3, the second spacer member 82 is disposed at a position corresponding to the second opening edge 73b of the air flow introduction portion 71 of the collection filter 7. The second spacer member 82 includes a vertical portion 82a that extends in a direction that is orthogonal to both the Y direction and the X direction, and a horizontal portion 82b that extends horizontally in the Y2 direction from the upper end edge of the vertical portion 82a. A notch 82e is provided at the corner portion of an end edge of the horizontal portion 82b on the side in the X1 direction. The dimension of the second spacer member 82 in the X direction is set to be slightly larger than the dimension of the second opening edge 73b of the air flow introduction portion 71 in the X direction. As illustrated in FIG. 5, the vertical portion 82a of the second spacer member 82 abuts against the outer surface of the side surface panel 71d of the air flow introduction portion 71 of the collection filter 7 on the side in the Y1 direction. The horizontal portion 82b of the second spacer member 82 abuts against the upper end of the second opening edge 73b of the air flow introduction portion 71 of the collection filter 7. That is, the entire second opening edge 73b of the air flow introduction portion 71 of the collection filter 7 is covered by the second spacer member 82.

A more specific description follows. FIG. 6A illustrates the dimensions of each portion of the filter insertion opening 63 of the front housing 61. FIG. 6B illustrates the dimensions of each portion of the collection filter 7, the first spacer member 81, and the second spacer member 82.

As illustrated in FIGS. 6A and 6B, a width (dimension in the Y direction in FIG. 2) W1 of the filter insertion opening 63 of the front housing 61 generally coincides with the sum (w2+2×w3=w1) of a width (dimension in the Y direction in FIG. 3) w2 of the collection filter 7 and respective thicknesses w3 of the first spacer member 81 and the second spacer member 82.

A height H1 from the bottom surface of the filter insertion opening 63 of the front housing 61 in the height direction (Z direction in FIG. 1) to the horizontal portion 66b of the corner beams 66A, 66B generally coincides with the sum (h3+h4) of a height (dimension in the Z direction in FIG. 1) h3 of the collection filter 7 and a thickness h4 of the first spacer member 81.

Therefore, as illustrated in FIG. 5, the first opening edge 73a of the air flow introduction portion 71 of the collection filter 7 is covered by the first spacer member 81. The second opening edge 73b of the air flow introduction portion 71 of the collection filter 7 is covered by the second spacer member 82. When the collection filter 7 is inserted into the front housing 61 through the filter insertion opening 63 in such a state, the outer surface of the vertical portion 81a of the first spacer member 81 abuts against the inner surface of the side surface panel 61c of the front housing 61. The upper surface of the horizontal portion 81b of the first spacer member 81 abuts against the lower surface of the horizontal portion 66b of the corner beam 66A. Consequently, the first spacer member 81 is held between the first opening edge 73a of the air flow introduction portion 71 and the inner surface of the front housing 61. That is, the first opening edge 73a and the inner surface of the front housing 61 do not abut against each other. Likewise, the outer surface of the vertical portion 82a of the second spacer member 82 abuts against the inner surface of the side surface panel 61d of the front housing 61. The upper surface of the horizontal portion 82b of the second spacer member 82 abuts against the lower surface of the horizontal portion 66b of the corner beam 66B. Consequently, the second spacer member 82 is held between the second opening edge 73b of the air flow introduction portion 71 and the inner surface of the front housing 61. That is, the second opening edge 73b and the inner surface of the front housing 61 do not abut against each other.

In the state illustrated in FIG. 5, a space C is present between the vertical wall portion 66a of the corner beam 66A and the vertical wall portion 66a of the corner beam 66B. The space C is an example of an "opening with a predetermined height formed between the upper edge portion of the filter insertion opening and the upper edge portion of the in-flow opening portion of the collection filter which is positioned below the upper edge portion of the filter insertion opening". The space C is blocked by fitting the fourth spacer member 84 therein as discussed later.

The third spacer member 83 is made of paper, as with the collection filter 7, and is constituted by folding paper (e.g. corrugated cardboard) in a flat plate shape so as to have a rectangular cross section. Specifically, as illustrated in FIG. 3, the third spacer member 83 is disposed on the upper surface 72b of the filter body portion 72 so as to extend in the Y direction. The dimension of the third spacer member 83 in the Y direction generally coincides with the dimension of the upper surface 72b of the filter body portion 72 in the Y direction. The height of the third spacer member 83 in the state in which no external force is applied to the third spacer member 83 is a dimension t3 in FIG. 3. The dimension of the clearance between the upper surface 72b of the filter body portion 72 and the lower surface of the horizontal panel 67b of the guiding member 67 in the state in which the collection filter 7 is inserted into the front housing 61 has a dimension t4 in FIG. 7. The dimension t3 is set to be slightly larger than the dimension t4. The third spacer member 83 is disposed on the upper surface 72b of the filter body portion 72 to be held between the upper surface 72b of the filter body portion 72 and the horizontal panel 67b of the guiding member 67. Consequently, the third spacer member 83 is slightly deformed so as to reduce the dimension of the third spacer member 83 in the up-down direction, which causes the third spacer member 83 to have a parallelogram cross section (see FIG. 7). With the third spacer member 83 disposed in this manner, the entire third opening edge 73c of the air flow introduction portion 71 is spaced from the upper surface panel 61b of the front housing 61 and the guiding member 67. As discussed earlier, there is a slight difference between the height position of the upper surface 72b of the filter body portion 72 and the height position of the upper end of the air flow introduction portion 71 (the height position of the first opening edge 73a and the second opening edge 73b). Therefore, there is a possibility that each of the horizontal portion 81b of the first spacer member 81 and the horizontal portion 82b of the second spacer member 82 is superposed on the upper side of the third spacer member 83. When the first spacer member 81 and the second spacer member 82 overlap the third spacer member 83, a gap may be formed between the first spacer member 81 and the first opening edge 73a and between the second spacer member 82 and the second opening edge 73b. In this case, paint mist may be discharged to the outside of the collection filter 7 via the gap. Thus, a notch (not illustrated) for suppressing overlap is preferably provided in at least one of the third spacer member 83 and the first spacer member 81 and the second spacer member 82. This makes it possible to suppress the formation of a gap between the first spacer member 81 and the first opening edge 73a and between the second spacer member 82 and the second opening edge 73b. Hence, it is possible to suppress discharge of paint mist to the outside of the collection filter 7.

As discussed earlier, the fourth spacer member 84 is fitted into the space C (see FIG. 5) between the vertical wall portion 66a of the corner beam 66A and the vertical wall portion 66a of the corner beam 66B. The virtual line in FIG. 5 indicates the position of the fourth spacer member 84, when the fourth spacer member 84 is fitted into the space C.

As illustrated in FIGS. 3 and 5, the fourth spacer member 84 includes a substrate 84a in a flat plate shape and a fitted portion 84b in a rectangular parallelepiped shape disposed at the center portion of the substrate 84a. The substrate 84a is set to be larger than the opening of the space C. The fitted portion 84b is constituted by stacking a plurality of sheets of corrugated cardboard, for example, and has a shape that generally matches the opening shape of the space C. Specifically, as illustrated in FIGS. 6A and 6B, a height H2 (dimension in the Z direction in FIG. 1) of the fitted portion 84b generally coincides with the sum of the height of the vertical wall portions 66a of the corner beams 66A, 66B and the thickness h4 of the first spacer member 81. The length (dimension in the Y direction) of the fitted portion 84b generally coincides with the dimension of the clearance between the vertical wall portion 66a of the corner beam 66A and the vertical wall portion 66a of the corner beam 66B.

As illustrated in FIG. 5, when the fourth spacer member 84 is mounted to the paint mist collection device 5 with the first spacer member 81, the second spacer member 82, and the third spacer member 83 held between the collection filter 7 and the front housing 61, the fitted portion 84b is fitted into the space C. Consequently, the fitted portion 84b of the fourth spacer member 84 is held between a portion of the front housing 61 that constitutes the opening edge of the space C and the fourth opening edge 73d of the air flow introduction portion 71. That is, the front housing 61 and the fourth opening edge 73d do not abut against each other. As discussed earlier, the notch 81e is provided in the horizontal portion 81b of the first spacer member 81. In addition, the notch 82e is provided in the horizontal portion 82b of the second spacer member 82. The shapes of the notches 81e, 82e generally match the shapes of the edge portions on both sides of the fitted portion 84b in the state of being fitted into the space C. Therefore, the first spacer member 81 and the second spacer member 82 do not overlap the edge portions on both sides of the fitted portion 84b. Consequently, the lower surface of the fitted portion 84b of the fourth spacer member 84 abuts against the fourth opening edge 73d. The distal end edges of the notches 81e, 82e and the outer surface of the fitted portion 84b preferably abut against each other. In this case, overlap between the first spacer member 81 and the fitted portion 84b of the fourth spacer member 84 can be suppressed. Therefore, the formation of a gap between the first spacer member 81 and the first opening edge 73a and between the fitted portion 84b of the fourth spacer member 84 and the fourth opening edge 73d, for example, can be suppressed. In addition, overlap between the second spacer member 82 and the fitted portion 84b of the fourth spacer member 84 can be suppressed. Therefore, the formation of a gap between the second spacer member 82 and the second opening edge 73b, for example can also be suppressed. By suppressing the formation of gaps in this manner, discharge of paint mist to the outside of the collection filter 7 via such gaps can be suppressed. The notches 81e, 82e may be provided in the fourth spacer member 84 in place of the first spacer member 81 and the second spacer member 82.

As described above, the spacer members 81 to 84 are each held in a clearance between each of the opening edges 73a to 73d of the in-flow opening portion 73 and the inner surface of the front housing 61.

Next, operation of the painting facility 1 configured as discussed earlier during painting will be described. In the painting facility 1, painting may be performed with a person present in the painting chamber 2 (to perform a so-called manual spray process), or painting may be performed with no person present in the painting chamber 2.

First, before the painting facility 1 starts painting, air at an adjusted temperature and an adjusted humidity is caused to flow from the air conditioner 32 into the air feed chamber 3 via the air feed duct 31. In the air feed chamber 3, the amount of the air is adjusted. The air in the amount adjusted in the air feed chamber 3 is introduced to the painting chamber 2 through the introduction port in the ceiling portion 25 of the painting chamber 2.

In the painting chamber 2, a flow of air from the air feed chamber 3 toward the recovery chamber 4 has been formed. In the painting chamber 2, the painting robots 24R, 24L operate to paint the object W to be painted. The painting is performed while the object W to be painted is moved in the Y1 direction by moving the transfer carriage 23 on the transfer rail 22.

Figure 8:
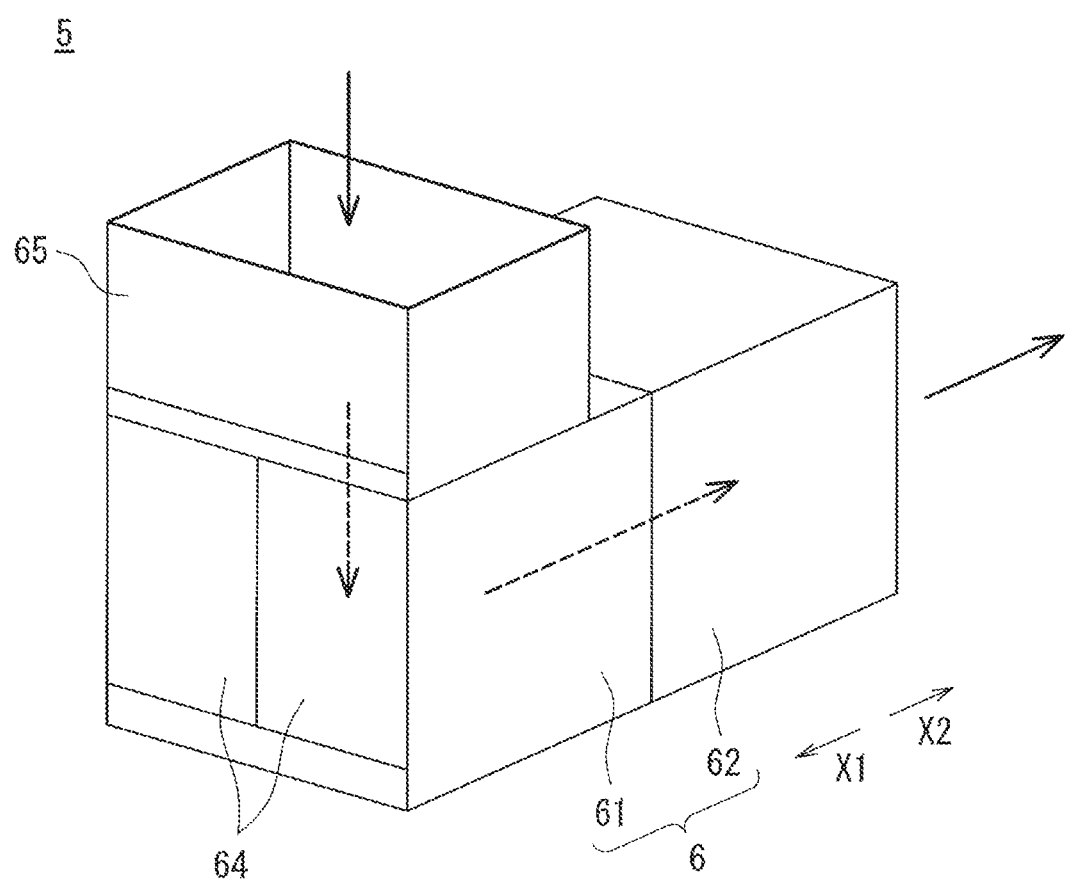
FIG. 8 illustrates an air flow that passes through the paint mist collection device.

A paint mist (over spray mist) not applied to the object W to be painted is generated during the painting by the painting robots 24R, 24L. The over spray mist is carried downward by a downward flow, and discharged to the recovery chamber 4. In the recovery chamber 4, an air flow that has passed through the opening 43 of the air flow guide 41 flows into the paint mist collection device 5. The paint mist contained in the air flow is collected by the paint mist collection device 5. The thus purified air is discharged to the outside of the facility via the exhaust duct 42. The arrows in FIG. 8 indicate the direction of the air flow that passes through the paint mist collection device 5. As illustrated in FIG. 8, the air flow that has passed through the air flow introduction duct 65 from above flows into the air flow introduction portion 71 of the collection filter 7 through the in-flow opening portion 73 (see FIG. 3). The air flow that has flowed into the air flow introduction portion 71 flows into the filter body portion 72 with the flowing direction changed to a horizontal direction (X2 direction). The paint mist in the air flow is collected by the filters 72a of the filter body portion 72. The air purified by collecting the paint mist is discharged to the outside of the painting facility 1 by way of the exhaust duct 42.

Figure 9:
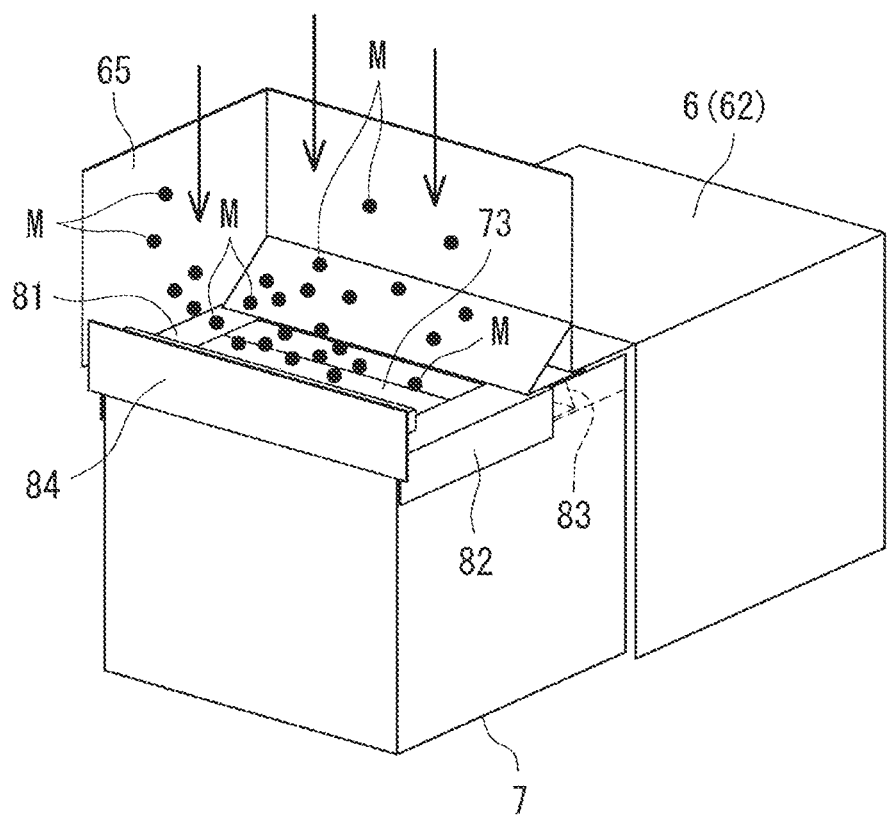
FIG. 9 illustrates the state of deposition of paint mist in the paint mist collection device.

FIG. 9 illustrates the state of deposition of paint mist M in the paint mist collection device 5. The front housing 61 and a part of the air flow introduction duct 65 are omitted in FIG. 9. The air flow discharged from the painting chamber 2 to the recovery chamber 4 flows into the housing 6 of the paint mist collection device 5 as illustrated in FIG. 9. A part of the paint mist M contained in the air flow does not flow into the collection filter 7, but is deposited on the inner surfaces of the housing 6 and the spacer members 81 to 84. In the present embodiment, the spacer members 81 to 84 are held in a clearance between the opening edges 73a to 73d (see FIG. 3) of the in-flow opening portion 73 of the collection filter 7 and the inner surface of the front housing 61. Therefore, deposition of the paint mist M across both the inner surface of the front housing 61 and the opening edges 73a to 73d of the in-flow opening portion 73 of the collection filter 7 is suppressed. As a result, sticking of the housing 6 and the collection filter 7 due to the paint is suppressed.

The collection filter 7 is regularly replaced when the painting work is performed for a predetermined period. In the work of replacing the collection filter 7, the doors 64 are opened to take the collection filter 7 out of the housing 6. Consequently, the collection filter 7 can be extracted from the inside of the housing 6 via the filter insertion opening 63. Since sticking of the housing 6 and the collection filter 7 due to the paint is suppressed as discussed earlier, the collection filter 7 can be taken out of the housing 6 easily. As a result, the work of replacing the collection filter 7 can be performed easily.

In the present embodiment, in particular, the first spacer member 81 and the second spacer member 82 extend along the X direction. That is, the first spacer member 81 and the second spacer member 82 extend along the take-out direction in which the collection filter 7 is taken out of the housing 6. Therefore, the first spacer member 81 and the second spacer member 82 can be extracted easily along the take-out direction. For example, the first spacer member 81 and the second spacer member 82 are taken out of the housing 6 via the filter insertion opening 63 before the collection filter 7 is taken out of the housing 6. Specifically, the first spacer member 81 and the second spacer member 82 are taken out of the housing 6 after the fourth spacer member 84 is removed from the housing 6. Consequently, a clearance can be formed at portions at which the first spacer member 81 and the second spacer member 82 have been held between the housing 6 and the collection filter 7. Therefore, the collection filter 7 can be taken out of the housing 6 easily.

In the present embodiment, the individual spacer members 81 to 84 are disposed in correspondence with the opening edges 73a to 73d, respectively, of the in-flow opening portion 73 of the collection filter 7. Therefore, the work of disposing the spacer members 81 to 84 and the work of taking out the spacer members 81 to 84 can be performed easily compared to the case where a single spacer member of an integral shape formed along all of the opening edges 73a to 73d of the in-flow opening portion 73 of the collection filter 7 is disposed, for example.

In the present embodiment, the third spacer member 83 is disposed in the state of being elastically deformed in the up-down direction by being held between the upper surface 72b of the filter body portion 72 and the horizontal panel 67b of the guiding member 67. Therefore, the outer surfaces of the third spacer member 83 are pressed against the upper surface 72b of the filter body portion 72 and the horizontal panel 67b of the guiding member 67. This makes it possible to secure well the sealing property between the third spacer member 83 and each of the filter body portion 72 and the horizontal panel 67b. Therefore, it is possible to suppress the formation of a gap between the third spacer member 83 and each of the filter body portion 72 and the horizontal panel 67b, and avoid the release of paint mist to the outside of the collection filter 7 through the gap.

First Modification

Next, a first modification will be described. The first modification is different from the above embodiment in the configuration of the first spacer member 81 and the second spacer member 82. Also in the first modification, the first spacer member 81 and the second spacer member 82 are configured to be symmetrical with respect to each other as discussed earlier. Therefore, the second spacer member 82 will be described as a representative, and the description of the first spacer member 81 will be omitted.

Figure 10:
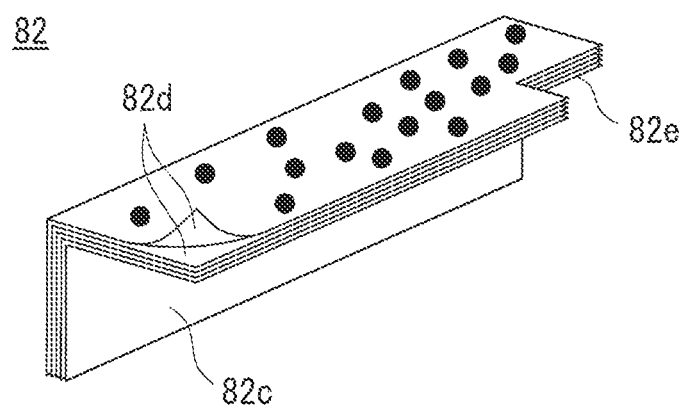
FIG. 10 is a perspective view illustrating a second spacer member according to a first modification.

FIG. 10 is a perspective view illustrating the second spacer member 82 according to the first modification. As illustrated in FIG. 10, the second spacer member 82 according to the first modification is configured such that a plurality of peelable sheets 82d is stacked on the entire surface of a base material 82c with an L-shaped cross section. The base material 82c may be made of paper (e.g. made of corrugated cardboard), or may be made of a resin. The peelable sheets 82d may be made of paper (e.g. made of paper that is thinner than corrugated cardboard), or may be made of a resin.

In the first modification, when paint is deposited on the surface of the second spacer member 82 (the surface of the outermost peelable sheet 82d) during the painting discussed earlier, the one peelable sheet 82d on which the paint has been deposited can be peeled off. Consequently, the paint can be removed from the second spacer member 82 together with the peelable sheet 82d that has been peeled off. Therefore, the second spacer member 82 can be reused easily by bringing the second spacer member 82 into a state in which no paint has been deposited on the surface thereof. As a result, the running cost of the painting facility 1 can be reduced.

Second Modification

Next, a second modification will be described. The second modification is different from the above embodiment in the configuration of the third spacer member 83. Therefore, the third spacer member 83 will be described here.

Figure 11:
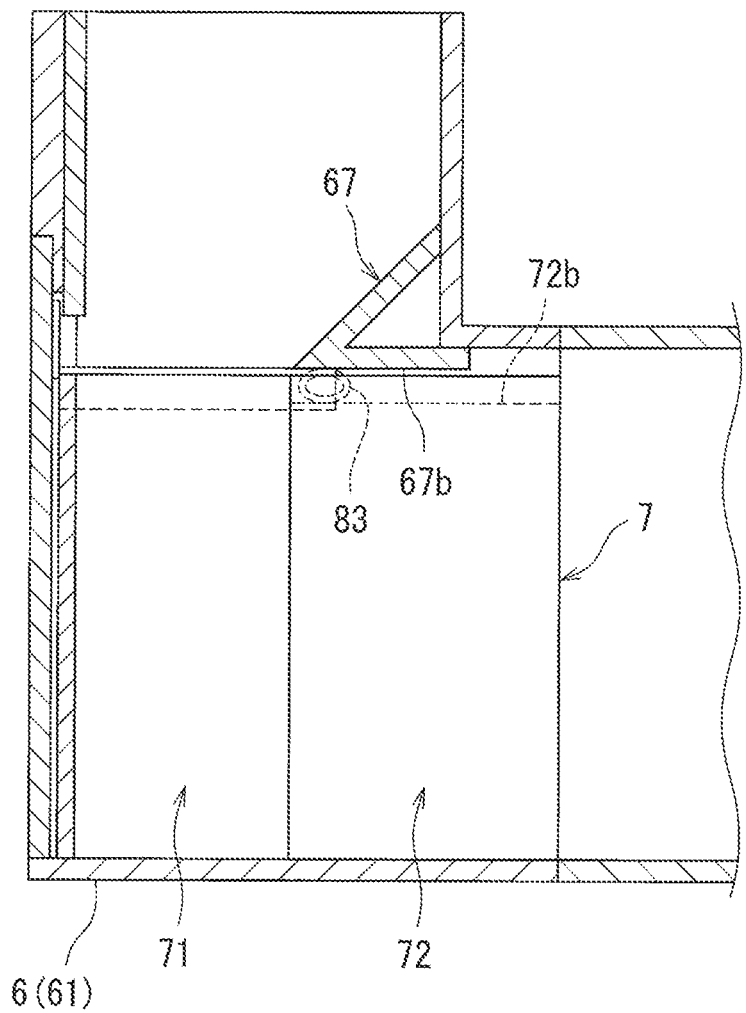
FIG. 11 is a view according to a second modification corresponding to FIG. 7.

FIG. 11 is a view according to the second modification corresponding to FIG. 7. In the embodiment discussed earlier, the third spacer member 83 has a rectangular cross section. In the second modification, the third spacer member 83 has a circular cross section. The third spacer member 83 according to the second modification is elastically deformed so as to have an elliptical cross section when the third spacer member 83 is held between the upper surface 72b of the filter body portion 72 and the horizontal panel 67b of the guiding member 67.

Also with the second modification, it is possible to secure well the sealing property between the upper surface 72b of the filter body portion 72 and the horizontal panel 67b of the guiding member 67 using the third spacer member 83. Therefore, it is possible to suppress the formation of a gap between the third spacer member 83 and each of the upper surface 72b of the filter body portion 72 and the horizontal panel 67b, and avoid the release of paint mist to the outside of the paint mist collection device 5 through the gap.

Third Modification

Next, a third modification will be described. The third modification is different from the above embodiment in the configuration of the fourth spacer member 84. Therefore, the fourth spacer member 84 will be described here.

Figure 12:
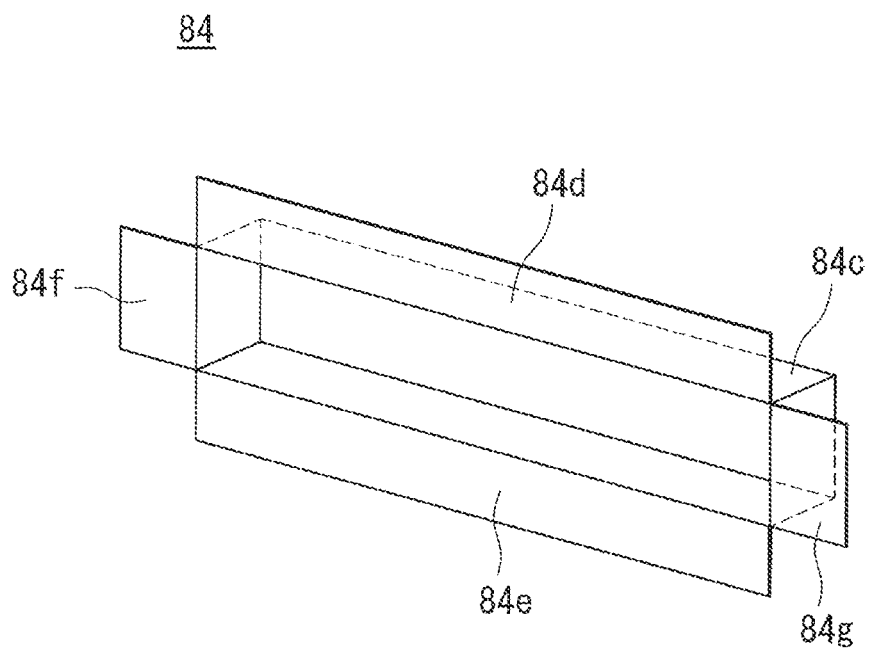
FIG. 12 is a perspective view illustrating a fourth spacer member according to a third modification.

FIG. 12 is a perspective view illustrating the fourth spacer member 84 according to the third modification. In the embodiment discussed earlier, the fourth spacer member 84 is configured to include the substrate 84a in a flat plate shape and the fitted portion 84b in a rectangular parallelepiped shape disposed at the center portion of the substrate 84*a*. In the third modification, the fourth spacer member 84 is fabricated by folding a single sheet of corrugated cardboard, for example. In the fourth spacer member 84 according to the third modification, the fitted portion 84*c* with a U-shaped cross section is constituted by folding a single sheet of corrugated cardboard. In the fourth spacer member 84 according to the third modification, flange portions 84*d*, 84*e*, 84*f*, 84*g* that extend in the upper, lower, left, and right directions from the outer edge of the fitted portion 84*c* are constituted by folding a single sheet of corrugated cardboard.

With the third modification, the fourth spacer member 84 can be fabricated easily, and the cost of manufacturing the fourth spacer member 84 can be reduced.

The present disclosure is not limited to the above embodiment or the above first to third modifications, and all modifications and applications included in the scope of the claims and a scope equivalent to the scope of the claims can be made.

For example, in the above embodiment and the above first to third modifications, the present disclosure is applied to the paint mist collection device 5 of the painting facility 1 that paints vehicle bodies of automobiles (object W to be painted). The present disclosure is not limited thereto, and may be applied to a paint mist collection device of a painting facility that paints other components (such as bumpers) of automobiles or components other than vehicle bodies of automobiles.

In the above embodiment and the above first to third modifications, the in-flow opening portion 73 of the collection filter 7 has a rectangular shape, and the (four) individual spacer members 81 to 84 are applied to the respective sides (opening edges 73*a* to 73*d*) of the in-flow opening portion 73 in a rectangular shape. The present disclosure is not limited thereto, and at least one of the four spacer members 81 to 84 may be provided. The shape of the in-flow opening portion 73 of the collection filter 7 is not limited to a rectangular shape, and may be other polygonal shapes, a circular shape, an elliptical shape, etc., for example. A plurality of spacer members may be disposed, or only one spacer member may be disposed, for the in-flow opening portion 73 in such shapes.

In the above embodiment and the above first to third modifications, the paint may be a water-based paint, or may be a solvent-based paint.

The present disclosure is applicable to a paint mist collection device provided in a painting facility to collect an over spray mist discharged from a painting chamber.

What is claimed is:

1. A paint mist collection device comprising:
   a housing configured such that an air flow containing paint mist discharged from a painting chamber flows into the housing;
   a collection filter disposed in the housing to collect the paint mist and configured to be taken out of the housing to be replaced; and
   a spacer member, wherein
   the spacer member is held in a clearance between an in-flow opening portion of the collection filter configured such that the air flow flows into the in-flow opening portion and an inner surface of the housing,
   the in-flow opening portion of the collection filter opens upward; and
   the spacer member is a member with an L-shaped cross section that includes a vertical portion that abuts against an outer surface of an opening edge of the in-flow opening portion of the collection filter and a horizontal portion that abuts against a distal end of the opening edge.

2. The paint mist collection device according to claim 1, wherein spacer members are disposed along opening edges of the in-flow opening portion of the collection filter.

3. The paint mist collection device according to claim 2, wherein one or more opening edges that are included in the opening edges of the in-flow opening portion of the collection filter extend along a take-out direction in which the collection filter is taken out of the housing, and one or more spacer members that are included in the spacer members are disposed along the one or more opening edges that extend along the take-out direction.

4. The paint mist collection device according to claim 1, wherein:
   the housing includes an air flow introduction duct configured to introduce the air flow toward the in-flow opening portion of the collection filter;
   the in-flow opening portion of the collection filter is smaller than an introduction opening of the air flow introduction duct;
   the air flow introduction duct includes a guiding member;
   the guiding member includes an inclined panel inclined toward an opening edge of the in-flow opening portion of the collection filter; and
   the spacer member is held in a clearance between the in-flow opening portion of the collection filter and the guiding member.

5. The paint mist collection device according to claim 4, wherein the spacer member is disposed in a state of being elastically deformed by being held in the clearance between the in-flow opening portion of the collection filter and the guiding member.

6. The paint mist collection device according to claim 1, wherein:
   the housing has a filter insertion opening and an opening;
   the filter insertion opening is configured such that the collection filter is taken out of and inserted into the housing via the filter insertion opening during replacement of the collection filter;
   the opening is disposed between an upper edge portion of the filter insertion opening and an upper edge portion of the in-flow opening portion of the collection filter with the collection filter inserted into the housing through the filter insertion opening, the upper edge portion of the in-flow opening portion being positioned below the upper edge portion of the filter insertion opening, and the opening having a predetermined height;
   the spacer member includes a fitted portion that has a height that matches the height of the opening; and
   the fitted portion is fitted into the opening.

7. The paint mist collection device according to claim 1, wherein the spacer member is constituted by stacking peelable sheets.

8. A paint mist collection device comprising:
   a housing configured such that an air flow containing paint mist discharged from a painting chamber flows into the housing;
   a collection filter disposed in the housing to collect the paint mist and configured to be taken out of the housing to be replaced; and
   a spacer member, wherein
   the spacer member is held in a clearance between an in-flow opening portion of the collection filter configured such that the air flow flows into the in-flow opening portion and an inner surface of the housing, the housing includes an air flow introduction duct configured to introduce the air flow toward the in-flow opening portion of the collection filter;

the in-flow opening portion of the collection filter is smaller than an introduction opening of the air flow introduction duct;

the air flow introduction duct includes a guiding member;

the guiding member includes an inclined panel inclined toward an opening edge of the in-flow opening portion of the collection filter; and the spacer member is held in a clearance between the in-flow opening portion of the collection filter and the guiding member.

9. The paint mist collection device according to claim 8, wherein spacer members are disposed along opening edges of the in-flow opening portion of the collection filter.

10. The paint mist collection device according to claim 9, wherein one or more opening edges that are included in the opening edges of the in-flow opening portion of the collection filter extend along a take-out direction in which the collection filter is taken out of the housing, and one or more spacer members that are included in the spacer members are disposed along the one or more opening edges that extend along the take-out direction.

11. The paint mist collection device according to claim 8, wherein the spacer member is disposed in a state of being elastically deformed by being held in the clearance between the in-flow opening portion of the collection filter and the guiding member.

12. The paint mist collection device according to claim 8, wherein the spacer member is constituted by stacking peelable sheets.

13. A paint mist collection device comprising:

a housing configured such that an air flow containing paint mist discharged from a painting chamber flows into the housing;

a collection filter disposed in the housing to collect the paint mist and configured to be taken out of the housing to be replaced; and a spacer member, wherein the spacer member is held in a clearance between an in-flow opening portion of the collection filter configured such that the air flow flows into the in-flow opening portion and an inner surface of the housing;

the housing has a filter insertion opening and an opening;

the filter insertion opening is configured such that the collection filter is taken out of and inserted into the housing via the filter insertion opening during replacement of the collection filter;

the opening is disposed between an upper edge portion of the filter insertion opening and an upper edge portion of the in-flow opening portion of the collection filter with the collection filter inserted into the housing through the filter insertion opening, the upper edge portion of the in-flow opening portion being positioned below the upper edge portion of the filter insertion opening, and the opening having a predetermined height;

the spacer member includes a fitted portion that has a height that matches the height of the opening; and the fitted portion is fitted into the opening.

14. The paint mist collection device according to claim 13, wherein spacer members are disposed along opening edges of the in-flow opening portion of the collection filter.

15. The paint mist collection device according to claim 14, wherein one or more opening edges that are included in the opening edges of the in-flow opening portion of the collection filter extend along a take-out direction in which the collection filter is taken out of the housing, and one or more spacer members that are included in the spacer members are disposed along the one or more opening edges that extend along the take-out direction.

16. The paint mist collection device according to claim 13, wherein:

the housing includes an air flow introduction duct configured to introduce the air flow toward the in-flow opening portion of the collection filter;

the in-flow opening portion of the collection filter is smaller than an introduction opening of the air flow introduction duct;

the air flow introduction duct includes a guiding member;

the guiding member includes an inclined panel inclined toward an opening edge of the in-flow opening portion of the collection filter; and the spacer member is held in a clearance between the in-flow opening portion of the collection filter and the guiding member.

17. The paint mist collection device according to claim 16, wherein the spacer member is disposed in a state of being elastically deformed by being held in the clearance between the in-flow opening portion of the collection filter and the guiding member.

18. The paint mist collection device according to claim 13, wherein the spacer member is constituted by stacking peelable sheets.

* * * * *